(12) United States Patent
Mayhew

(10) Patent No.: US 6,354,327 B1
(45) Date of Patent: Mar. 12, 2002

(54) AUTOMATIC POSITION-CONTROL VALVE ASSEMBLY

(75) Inventor: John Mayhew, Salem, VA (US)

(73) Assignee: Virginia Valve Company, Salem, VA (US)

( * ) Notice: Subject to any disclaimer, the term of this patent is extended or adjusted under 35 U.S.C. 154(b) by 0 days.

(21) Appl. No.: 09/629,101

(22) Filed: Jul. 31, 2000

(51) Int. Cl.[7] ............................................. F15B 13/04
(52) U.S. Cl. ............................. 137/596; 251/26; 91/32
(58) Field of Search .......................... 137/596; 251/26; 91/32

(56) References Cited

U.S. PATENT DOCUMENTS

| | | |
|---|---|---|
| 3,786,827 A | 1/1974 | Berg |
| 4,096,699 A | 6/1978 | Zitelli |
| 4,342,332 A | 8/1982 | Lapp |
| 4,417,312 A | 11/1983 | Cronin et al. |
| 4,430,846 A | 2/1984 | Presley et al. |
| 4,744,542 A | 5/1988 | Heusser |
| 4,955,195 A * | 9/1990 | Jones et al. .................. 91/32 X |
| 5,081,904 A | 1/1992 | Horn et al. |
| 5,097,857 A | 3/1992 | Mayhew |
| 5,198,973 A | 3/1993 | Steurtermann |
| 5,654,885 A | 8/1997 | Mayhew et al. |

* cited by examiner

Primary Examiner—Gerald A. Michalsky

(57) ABSTRACT

According to principles of this invention, an override controller is structured for being placed in pressurized fluid lines between a valve position transducer and a valve position actuator of an automatic position-controlled valve assembly, with the override controller receiving uncontrolled supply pressurized fluid and having an exhaust. The override controller receives pressurized fluid at first and second inlet ports from the valve position transducer and furnishes this pressurized fluid to the valve position actuator through first and second outlet ports for controlling the position of the valve during normal operation. However, valve mechanisms of the override controller can also be placed in positions for stopping flow of pressurized fluid through the first and second inlet ports and providing fluid flow from the uncontrolled pressurized fluid to the first and second outlet ports for controlling the position of an industrial valve during override operation.

7 Claims, 3 Drawing Sheets

AUTOMATIC POSITION-CONTROL VALVE ASSEMBLY

BACKGROUND OF THE INVENTION

This invention relates broadly to automatic position-control valve assemblies and more specifically to safety features for them.

It is well known that factories and other industrial installations are increasingly automated. There are, for example, apparatus for automatically and continuously repositioning industrial valves to achieve desired fluid flows. Often desired flows change with changing conditions. For example, it may be desirable to control fluid flow so as to maintain a selected pressure, temperature, flow rate, or level. In fact, many industrial installations include fluid-condition transducers for monitoring flow (as measured by temperature, pressure, flow rate, and so forth), with electrical signals. Similarly, many industrial valves include valve position feedback potentiometers, or transducers, sometimes combined with limit switches, for providing signals which are indicative of valve positions. Normally, a valve position signal is used to provide a visual readout as to a valve's position. In some cases a fluid-condition signal is fed to a set point process controller which determines therefrom a new desired position of an industrial valve element. The set point process controller then sends a "desired-position signal" to a valve position controller which adjusts an industrial valve element to a new position by means of a pressurized-fluid system (such as a pneumatic system). Changing the position of the industrial valve element causes a desired change in the condition of the fluid.

Prior-art systems include various components of this apparatus in single housings, while others separate the components in other ways. U.S. Pat. No. 4,417,312 to Cronin et al., U.S. Pat. No. 5,198,973 to Steurtermann and U.S. Pat. No. 5,654,885 to Mayhew et al. disclose various prior-art systems of this general type.

In many such prior-art systems a valve position transducer—such as a Moore Valve PAC™ Digital Valve Controller, Intelligent Valve Control, series 760D—is rigidly attached to a valve position actuator, so that the valve position transducer can sense a position into which the valve position actuator has moved the valve element via the valve position actuator. An actuating fluid, such as air, is fed to the valve position transducer. The valve position transducer compares a desired-position signal with the position of the actual valve element and from this comparison determines a direction of movement for the valve element. To achieve valve-element movement, the valve position transducer feeds actuating fluid to the valve position actuator to move the valve element to the new desired position.

A difficulty that sometimes develops in use of such automatic position-control valve assemblies occurs when a valve position transducers fail. In this regard, valve position transducers require extremely clean air, which is difficult to maintain in some industries. Such valve position transducers, for example, will not work with regular compressed air. Users must normally work on such valve positioners regularly to keep them clean. In any event, they sometimes have control signal problems. When valve position transducers have such problems, or otherwise fail, they sometimes drive valve elements to incorrect positions, with drastic results. When this has happened, or when valve position transducers have been worked on, it has been necessary for operators to try to move the valve elements to appropriate positions by hand or to quickly replace the valve position transducers, or replace the entire valve assemblies, including the valve position transducers and the valve position actuators. Usually, these corrective steps have required that the monitored-and-controlled fluid flow be turned off until corrective actions have been taken, thus, the entire operations have been shut down. Further, it has often been inconvenient to replace such components, because replacement parts have not always been immediately available and/or technicians with the ability to replace them have not been available. Thus, operations have often been shut down for long periods of time.

Thus, it is an object of this invention to provide an override mechanism for easily moving a valve element of a valve controlled by a valve position transducer to a desired position when its valve position transducer malfunctions, while allowing the valve position transducer to be replaced without shutting down a primary fluid flow being controlled.

SUMMERY OF THE INVENTION

According to principles of this invention, an override controller is structured for being placed in pressurized fluid lines between a valve position transducer and a valve position actuator of a automatic position-controlled valve assembly, with the override controller receiving uncontrolled pressurized fluid independently of the valve position transducer. The override controller includes a valve mechanism for receiving controlled pressurized fluid at first and second inlet ports from the valve position transducer and furnishing this pressurized fluid to the valve position actuator through first and second outlet ports for controlling the position of a valve element during normal operation. However, the valve mechanism of the override controller can also be set for stopping flow of controlled pressurized fluid through the first and second inlet ports and developing itself controlled fluid flow from the uncontrolled pressurized fluid to the first and second outlet ports for controlling the position of the valve element during an override operation.

BRIEF DESCRIPTION OF THE DRAWINGS

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENT

Figure 1:
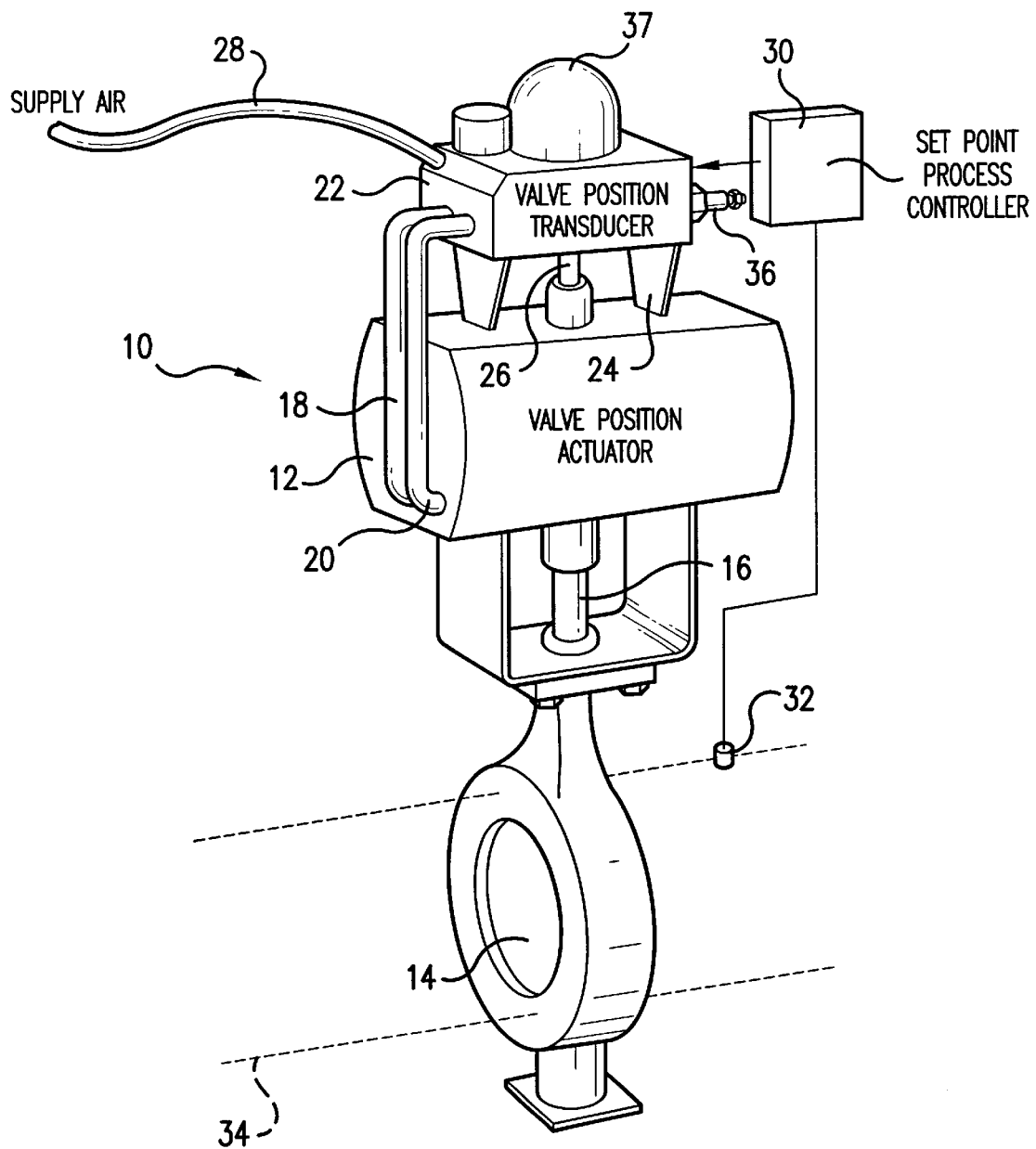
FIG. 1 is a schematic, isometric, partially-block, view of a prior-art automatic position-controlled, valve assembly.

First, the structure and operation of a prior-art automatic position-controlled valve assembly 10 will be described with reference to FIG. 1.

The prior-art automatic position-controlled valve assembly 10 includes a valve position actuator 12 which controls the position of a valve element of a butterfly valve 14 via a valve-control shaft 16. The valve position actuator 12 is basically a piston working in a cylinder, with the piston being moved in one direction when pressurized air, or other fluid, is provided on a first pressurized-air line 18 and in an opposite direction when pressurized air is provided on a second pressurized-air line 20. It should be understood that the piston (not shown) need not be a linearly-moving piston, but can also be a rotating member which is caused to rotate by pressurized fluid. In any event, the piston is linked to the shaft 16 for causing the shaft 16 to rotate in a first direction when the piston is moved in a first direction and in a second, opposite, direction when the piston is moved in a second, opposite, direction. A valve position transducer 22 is rigidly mounted on the valve position actuator or 12 by brackets 24, with a valve-position shaft 26 of the valve position transducer 22 also being linked to the piston of the valve position actuator or 12. Thus, by noting the rotary position of the valve-position shaft 26, the valve position transducer 22 knows the position of the butterfly valve 14. The valve position transducer 22 receives uncontrolled supply pressurized air through a supply-air line 28 which it controls to, in turn, control the position of the butterfly valve 14 via the first and second pressurized-airlines 18 and 20 and the valve position actuator 12. The valve position transducer 22 also receives a conduit-fluid-condition signal from a set point process controller 30 which, in turn, receive a fluid-condition signal from a fluid condition transducer 32, which measures a condition of fluid whose flow through a conduit 34 is controlled by the butterfly valve 14. Again, it should be understood that this invention will work with other industrial valves besides butterfly valves. It should also be understood that although the fluid-condition transducer 32 is shown in a configuration in which it would come into contact with fluid, in some embodiments, it would not come in contact with fluid. For example, it could measure and outside temperature of a conduit. The valve position transducer 22 has an exhaust 36 and a visual readout 37 for displaying the position of the butterfly valve 14.

Describing now an overall operation of the prior-art automatic position-controlled valve assembly 10, the set point process controller 30 receives a signal from the fluid-condition transducer 32 telling the set point process controller 30 if more or less fluid flow through the conduit 34 is required. The set point process controller 30 then sends a desired-position signal to the valve position transducer 22, which compares the desired position with the actual position of the valve and thereby determines a direction in which the industrial valve (butterfly valve) 14 must move to achieve the desired position. The valve position transducer 22 then controls flow of pressurized fluid through the first and second pressurized-air lines 18 and 20 to the valve position actuator 12 to move the butterfly valve 14 toward the desired position. Thereafter this new position of the butterfly valve 14 continues to be monitored by the fluid condition transducer 32 and the cycle is repeated again and again. With regard to how the valve position transducer 22 controls the position of the butterfly valve 14 via the first and second pressurized-air lines 18 and 20, if the valve position transducer 22 wants to move the butterfly valve 14 in a first direction, it applies pressurized fluid from the supply air line 28 to the first pressurized air line 18 and exhausts the second pressurized-air line 20 via the exhaust 36. Thus, one side of the piston in the valve position actuator 12 is pressurized and the other side is open to atmosphere so that the piston moves in the first direction. Similarly, to move the piston in the second, opposite, direction, the second pressurized-air line 20 is fed pressurized fluid and the first pressurized-air line 18 is exhausted to atmosphere via the exhaust 36 by the valve position transducer 22.

Should the valve position transducer 22 of this prior-art automatic position-controlled valve assembly 10 malfunction, because of moisture for example, an operator would have to quickly replace the valve position transducer 22 or the entire assembly 10 so that the fluid flowing through the conduit 34 would again be properly controlled. If the operator must replace either the valve positioner transducer 22 or the valve itself, or if an operator must simply work on the valve positioner transducer 22, this requires shutting down fluid flow through the conduit 34, and perhaps draining the conduit. In any case, it has usually been necessary to cease operations entirely. All of these procedures are time-consuming, and costly, inefficient and could cause damage.

Figure 2:
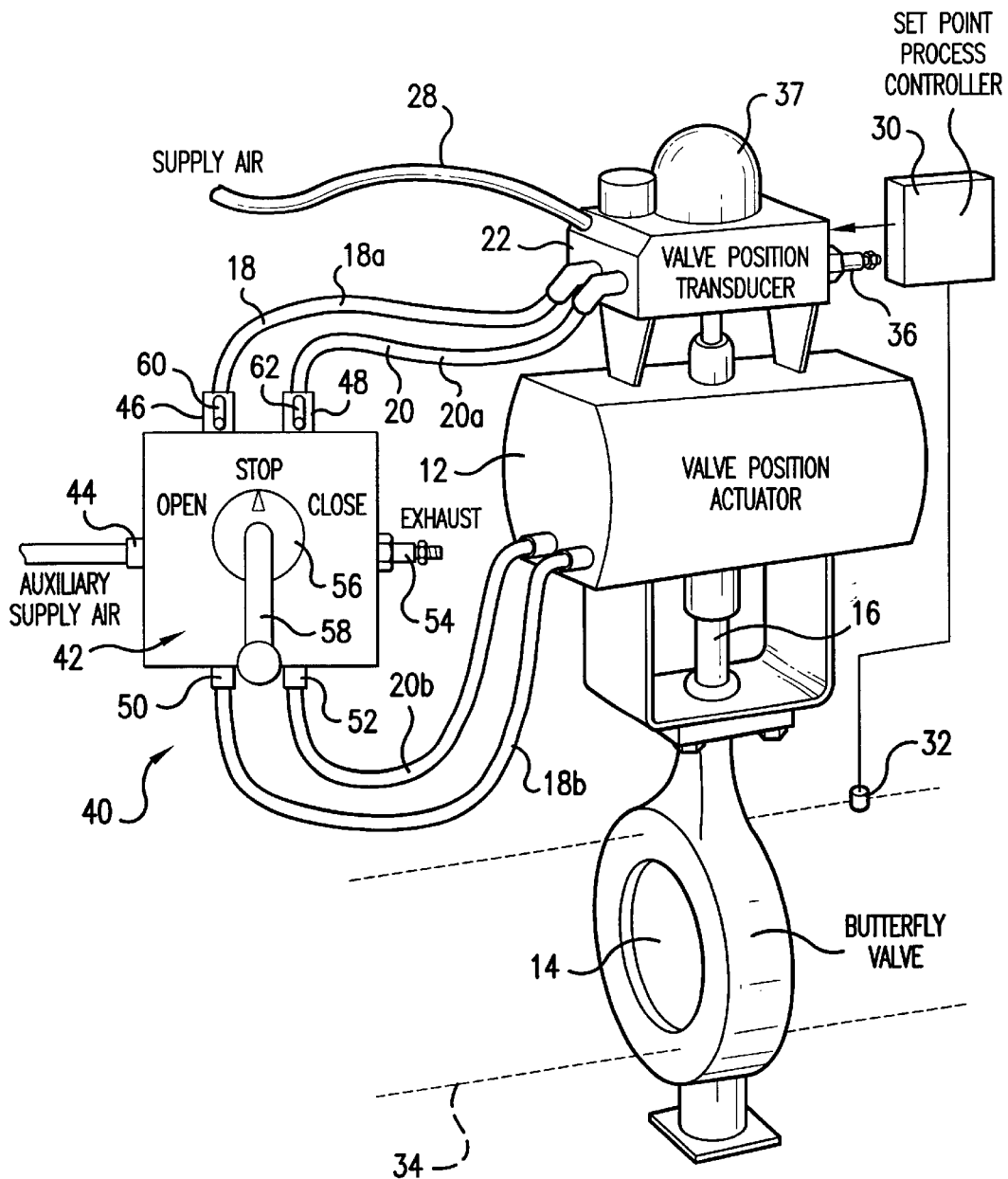
FIG. 2 is a schematic, isometric, partially-block view of an automatic position-controlled valve assembly of this invention.

Looking now at an automatic position-controlled valve assembly 40 of this invention depicted in FIG. 2, this assembly is generally the same as the prior-art assembly of FIG. 1, with the exception that the first and second pressurized-air lines 18 and 20 have been modified and an override controller 42 (see FIG. 3 for details) has been added in the first and second pressurized-air lines. Regarding changes to the first and second pressurized-air lines 18 and 20, these have now become flexible and are broken into inlet sections 18a and 20a and outlet sections 18b and 20b, with the override controller 42 being inserted between inlet sections 18a and 20a and outlet sections 18b and 20b.

The override controller 42 receives uncontrolled supply pressurized air via an auxiliary air-supply port 44. This supply pressurized air is the same as the supply pressurized air received by the valve position transducer 22 on the supply-air line 28, and is, therefore, uncontrolled in the sense that it is not controlled by the valve position transducer 22. The override controller 42 has first and second inlet ports 46 and 48 for receiving pressurized air that is controlled by the valve position transducer 22 via the inlet sections 18a and 20a of the first and second pressurized-air lines 18 and 20 and first and second outlet ports 50 and 52 for providing controlled pressurized air to the valve position actuator 12 via the outlet sections 18b and 20b of the first and second pressurized-air lines 18 and 20. The override controller 42 also has an adjustable exhaust 54 which is used to exhaust a desired one of the outlet sections 18b and 20b of the first pressurized-air lines 18 and 20, as will be further described below. This adjustable exhaust is also used to control the speed of the valve position actuator 12 for controlling the valve 14. If the valve 14 is operated too fast its action can cause a "water hammer" effect that could damage the pipeline. The adjustable exhaust 54 helps to keep the valve 14 from overshooting a desired position required for proper flow when the manipulator 58 is used to manually position the valve for the desired flow.

The controller 42 further includes a valve mechanism 56 which is controlled by a manipulator 58 that can move the valve mechanism 56 to any one of three separate positions, namely, an "open" position a "stop" position and a "close" position. In FIG. 2 the manipulator 58, which is shown as being manually operable, is in the "stop" position. SMC sells four way hand valves under the designation of VH series which will work as the valve mechanism 56, in particular models VH210-NO2, VH310-NO2, VH330-NO2, NO3 and others.

Figure 3:
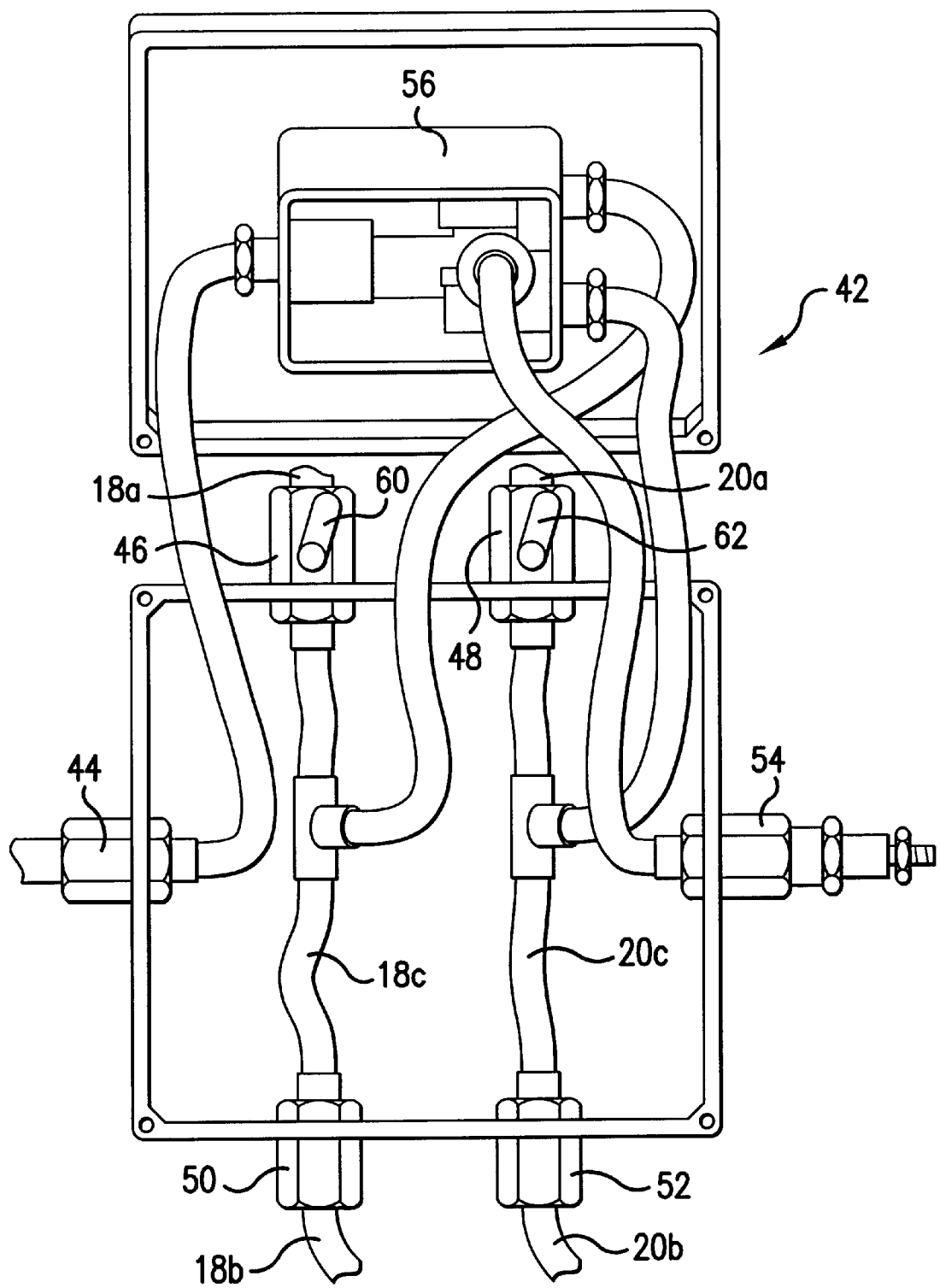
FIG. 3 is an exploded isometric view of an override controller of the automatic position-controlled valve assembly of FIG. 2

Each of the first and second inlet ports 46 and 48 of the controller 42 has an on/off inlet valve, which are respectively designated in FIGS. 2 and 3. as first inlet valve 60 and second inlet valve 62, with each inlet valve having a manually moveable handle. Otherwise, the first and second inlet ports 46 and 48 are respectively directly coupled to the first and second outlet ports 50 and 52, as shown in FIG. 3. The valve mechanism 56 interconnects lines 18c and 20c between the respective first inlet and outlet ports 46 and 50 and the second inlet and outlet ports 48 and 52.

In operation, when the automatic position-controlled valve assembly 40 is operating normally, as described above for the prior-art system of FIG. 1, the first and second inlet valves 60 and 62 are open, as shown in FIG. 2, and the manipulator 58 is in the "stop" position, also as shown in FIG. 2. In this configuration, pressurized air and atmospheric air appearing on the inlet sections 1 8a and 20a of the first and second pressurized-air lines 18 and 20 are passed directly through the lines 18c and 20c to the outlet sections 18b and 20b of the first and second pressurized-air lines 18 and 20 and to the valve position actuator 12. Further, air flow through the auxiliary air-supply port 44 and the exhaust 44 is shut off by the valve mechanism 56. In this configuration, the automatic position-controlled valve assembly 40 functions in exactly the same manner as was described previously for the prior-art automatic position-controlled valve assembly 10. That is, the valve position transducer 22 has direct control over the valve position actuator 12 and acts directly thereon to move the butterfly valve 14 to the desired position.

However, should the valve position transducer 22 malfunction, its control over the valve position actuator 12 can easily be terminated for an override operation by simply rotating the first and second inlet valves 60 and 62 on the first and second inlet ports 46 and 48. Once the first and second inlet valves 60 and 62 are turned off, pressurized air and atmospheric air appearing in the first and second inlet sections 18a and 20a of the first and second pressurized-air lines 18 and 20 cannot reach the first and second outlet sections 18b and 20b of the first and second pressurized-air lines 18 and 20 via the lines 18c and 20c. So long as the manipulator 58 remains in the "stop" position fluid flow is also prevented through the auxiliary air-supply port 44 and the exhaust 54 by the valve mechanism 56 to thereby "lock" the valve position actuator 12 in position. However, should the valve mechanism 56 be manipulated by the manipulator 58 to the "open" position, it places pressurized air at the auxiliary air-supply port 44 in communication with the line 18c and therefore with the outlet section 18b of the first pressurized-air line 18, and the exhaust 54 in communication with the line 20c and therefore with outlet section 20b of the second pressurized-air line 20. This, of course, places pressure on one side of the piston in the valve position actuator 12 while subjecting the other side to atmosphere, which causes the piston to move in a first direction for opening the butterfly valve 14. Similarly, if the manipulator 58 is moved to the "close" position the line 20c and the outlet section 20b is placed in communication with the auxiliary air-supply port 44 and the line 18c and outlet section 18b is placed in communication with the exhaust 54 by the valve mechanism 56. This causes the piston to move in an opposite, second, direction toward closing the butterfly valve 14. When the butterfly valve is being thusly moved to a new position, the operator can, at any time, move the manipulator 58 to the "stop" position and thereby lock the butterfly valve 14 in its current position by closing flow through the auxiliary air-supply port 44 and/or the exhaust 54. The operator can monitor the position of the butterfly valve 14 by looking at the visual readout 37. Thus, operation of the valve position actuator 12 has manually overridden.

Once the first and second inlet valves 60 and 62 have been closed, the valve position transducer 22 can be removed and worked on or replaced without affecting the valve position actuator 12 or the butterfly valve 14.

It should be understood that the first and second inlet valves 60 and 62 could also be linked to the manipulator 58. For example, the manipulator 58 could have a fourth position in which the first and second inlet valves 60 and 62 are open and the auxiliary air-supply port 44 and the exhaust 54 are closed, with there being free flow between the inlet and outlet sections 18a, 20a and 18b, 20b of the first and second pressurized-air lines 18 and 20. In this embodiment, if the manipulator 58 is manipulated to any of the "stop", "open" or "close" positions, first and second inlet valves 60 and 62 are automatically closed and all other connections are as described above for override operation.

An advantage of the override controller of this invention is that it can be relatively easily retrofitted to prior-art automatic position-controlled valve assemblies.

Still another advantage is that the override controller of this invention does not utilized electricity, so that it creates no danger of explosion.

The override controller of this invention is relatively inexpensive to construct and install, but yet it provides tremendous benefits when a valve position transducer of an automatic position-controlled valve assembly malfunctions.

While the invention has been particularly shown and described with reference to a preferred embodiment, it will be understood by those skilled in the art that various changes in form and detail may be made therein without departing from the spirit and scope of the invention. For example, although the invention has been described primarily for use in pneumatic systems, it can also be used with other pressurized fluids. Also, it can be used with other types of valves. Further, the manipulator 58 of the override controller 42 is not controlled manually in one embodiment, but rather electronically or otherwise mechanically.

The invention claimed is:

1. An override controller for an automatic position-control valve assembly comprising:

first and second inlet ports, each for receiving pressurized fluid controlled by a valve-position transducer for moving a valve to a position determined by the valve-position transducer;

first and second outlet ports for being attached to a valve-position actuator, each for furnishing the pressurized fluid controlled by the valve-position transducer to the valve-position actuator for moving a valve in either of opposite directions;

an override exhaust port for exhausting fluid from an outlet port when the other outlet port is pressurized;

an auxiliary air-supply port for receiving pressurized supply fluid uncontrolled by the valve-position transducer;

first and second inlet valves respectively for each of said first and second inlet ports, said first and second inlet valves each having a normal position for allowing flow of pressurized fluid through the respective first or second inlet port and a closed, or override, position for blocking flow of pressurized fluid through the respective first or second inlet ports;

an override valve mechanism coupled to said first and second outlet ports, said exhaust port and said auxiliary air-supply port, said override valve mechanism including a manipulator for moving said valve mechanism to a stop position in which the valve mechanism blocks pressurized fluid flow through said auxiliary air-supply port and said override exhaust port, to an open position in which the valve mechanism allows fluid flow between said auxiliary air-supply port and said first outlet port and between said override exhaust port and said second outlet port, and to a closed position in which the valve mechanism allows fluid flow between said auxiliary air-supply port and said second outlet port and between said override exhaust port and said first outlet port;

whereby, control of a valve position actuator can be taken over by said override controller by moving said first and second inlet valves to the override position and thereafter using the manipulator of the override valve mechanism for controlling the valve position actuator.

2. The override controller of claim 1 wherein said first and second inlet valves are independent individual valves at the first and second inlet port respectively.

3. The override controller of claim 2 wherein the first and second inlet valves are manually operable.

4. The override controller of claim 3 wherein the manipulator of the override valve mechanism is manually operable.

5. The override controller of claim 1 wherein the first and second inlet valves are manually operable.

6. The override controller of claim 1 wherein when the override valve mechanism is in the stop position, fluid is allowed to flow between said first inlet port and said first outlet port and between said second inlet port and said second outlet port by said override valve mechanism.

7. The override controller of claim 6 wherein the manipulator of the override valve mechanism is manually operable.

* * * * *